(No Model.)
A. WURTS.
SYSTEM OF LIGHTNING PROTECTION FOR ELECTRIC CIRCUITS.
No. 574,978. Patented Jan. 12, 1897.
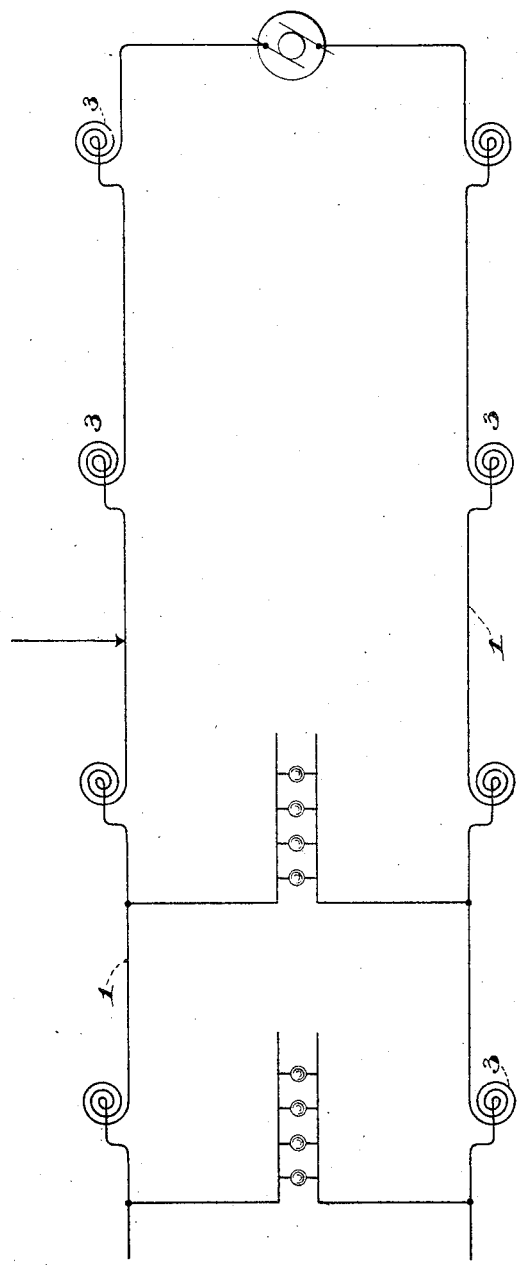
WITNESSES:
INVENTOR
Alexander Wurts
BY
Terry and MacKay
ATTORNEYS.

UNITED STATES PATENT OFFICE.

ALEXANDER WURTS, OF PITTSBURG, PENNSYLVANIA, ASSIGNOR TO THE WESTINGHOUSE ELECTRIC AND MANUFACTURING COMPANY, OF SAME PLACE.

SYSTEM OF LIGHTNING PROTECTION FOR ELECTRIC CIRCUITS.

SPECIFICATION forming part of Letters Patent No. 574,978, dated January 12, 1897.

Application filed July 19, 1893. Serial No. 480,899. (No model.)

*To all whom it may concern:*

Be it known that I, ALEXANDER WURTS, a citizen of the United States, residing in Pittsburg, in the county of Allegheny and State of Pennsylvania, have invented a new and useful Improvement in Systems of Lightning Protection for Electric Circuits, (Case No. 563,) of which the following is a specification.

My invention relates to certain means for the protection of lines or conductors, such, for instance, as those employed in railway-circuits, lighting-circuits, and other systems of distribution, from the injurious effects of atmospheric electricity, and also to a method whereby such protection may be afforded.

Heretofore it has been customary to provide for systems of distribution safety devices for the harmless discharge of static electricity which may have collected upon the line or which may be suddenly induced upon it by a more or less distant lightning-stroke. The simplest form of these safety devices is the well-known spark-gap arrester presenting opposite points, one connected electrically to the line and the other to the earth, whereby the static electricity is caused to discharge itself across said points in preference to rupturing the insulation or burning out the coils of any translating devices connected to the line. These spark-gap arresters and, indeed, many other forms of lightning-arrester become quite inefficient when employed in connection with systems of electrical distribution carrying high voltages, and this danger becomes excessive where potentials of five to ten thousand volts are employed. It is the object of my invention to do away with all spark-gaps or equivalent devices and to provide means whereby the line may be protected without the use of such apparatus and without the occurrence of any static discharge whatever.

My invention is illustrated in the accompanying drawing, in which is shown a system of distribution having proper choke-coils introduced therein in series in accordance with my invention.

It is well known that conducting bodies on the surface of the earth, and to a greater or less extent all bodies, are constantly undergoing changes of electrical condition due to atmospheric electrical disturbances. These changes of condition become particularly dangerous and violent during the prevalence of thunder-storms, and the devices known as "lightning-arresters" are designed to protect the large conducting areas employed in electrical-distribution systems from the injurious effects of these atmospheric electrical disturbances. It is an event of comparative rarity that an actual lightning-stroke should strike an electric wire, and when such event takes place no device yet invented is capable of preventing such a lightning-stroke from causing damage to the system.

The cause of those troubles which lightning-arresters are calculated to avoid is the accumulation of a static charge more or less gradually upon some part or parts of the conductors of a distribution system, which conductors generally cover a large area, and therefore are subject to greater electrical disturbance. These charges under certain conditions necessarily seek a path to the earth, and if this path be found only through the translating devices of the system these latter necessarily suffer. Lightning-arresters are intended to provide a harmless path for these discharges. The principal causes for charges of this nature are induction from an overhanging highly-charged cloud, a quasi-dynamic induction due to lightning discharge in the vicinity of the system, accidental accumulation of charge due to readjustment of the potential on surrounding objects in a lightning discharge, direct conduction from a charged atmosphere, and direct conduction to bare trolley-wires from drops of rain. These are some of the ascertained causes for accumulation of static charges, and it is well known that where static induction is present a charge of this nature may be confined to a comparatively small space on the principle of the electrophorous. This temporary confining of the charge to a small portion of the system is of frequent occurrence, and it is when any readjustment of electrical conditions liberates this charge and permits its equable distribution throughout the system that the greatest danger to the system is present. A charge which has locally accumulated in this manner and is suddenly liberated and permitted to expand through the system may be likened to a body of water under pressure suddenly permitted to travel through a system of tubing, the pressure being more or less maintained. If the system of tubing is perfectly straight, the pressure will be everywhere uniform, and there will be comparatively little danger of rupture. If, on the other hand, the system of tubing has many turns or curves or many changes of diameter, each of these will serve to create local pressure which may often be so violent as to cause rupture of the tubing. The principle governing the hammer-blow of fluids in movement through curved pipes is well understood; but it has not, as far as I know, been hitherto recognized that systems of electrical distribution are subject to conditions closely analogous to those present under the conditions above named in the hydraulic system.

It is well known that points in any body holding a static charge are always charged to a higher potential than other portions of the body. The shape of an electrically-charged conductor determines the distribution of potential over its surface, and it is therefore to be presumed that as a local charge is permitted to distribute itself throughout a conducting system the "surging" of the charge through the line, so to speak, will produce violent strains at sharp points and other parts, which, owing to their shape, are calculated to receive a high potential.

There are also present in systems of electrical distribution special points, which may be termed by analogy "points of reflection." These are such as tend to lead the charge into a *cul de sac* or to present a point from which the charge tends to jump. All sharp turns in a wire are more or less points of reflection, and as the movement of the static charge is oscillatory in character these points of reflection will be subject to repeated and violent strains. It is at these points that rupture of the dielectric is most apt to take place, and if such points of reflection occur at or near a translating device the danger of injury thereto is vastly increased. I have found by experiment that if a straight conductor is connected at one end to the terminals of an influence-machine and the other end is presented to the knob of a Leyden jar with a considerable space between the end of the wire and the knob the charge will be carried by the wire from the machine to the jar and a spark will jump from the end of the wire to the Leyden jar, the wave returning immediately to the machine and leaving the jar uncharged. This shows that there is a transfer of static charge back and forth over the wire which is even sufficient to pass through the space between the knob of the jar and the end of the wire. The occurrence of this wave is very beautifully shown if the experiment be conducted in the dark without a Leyden jar and the wire used be bare. The end of the wire will then be seen to glow at intervals, becoming red and black by turns, thus showing that there is a repeated occurrence of strain at the end of the wire, which in this case forms a point of reflection. It may be stated that no other part of the wire exhibits this phenomenon under these conditions and that if the knob of the Leyden jar be presented to the middle of the wire the spark will not occur and none of the phenomena noted in the Leyden-jar experiment above will take place.

In the drawing a system of electrical distribution is shown at 1.

Suppose that a local charge has been accumulated at the point 2 by any causes to which electrical-distribution systems are subject. Upon the liberation of this charge by destruction of the holding cause there will be a tendency to a wave-like distribution from the point 2 throughout the whole system, and every point of reflection will be subject to an intense strain, even where the potential originally produced is comparatively low for static charges. The problem to be solved then is to divert and consume the energy otherwise displayed at points of reflection, so as to protect such points from the above-named strain. I accomplish this by breaking up the waves or surgings of the static charge by means of choke-coils 3, which divide the system of distribution into sections and cause a conversion of the energy of the static charge into heat at the point of resistance produced by such choking-coils.

The self-induction of the choke-coils 3 is so high as to prevent the discharge of static electricity from one section between the coils to another except to an extremely-limited extent. The efficiency of this self-induction is due to the extremely rapid oscillations in opposite directions, which are present in every movement of static electricity. The choking-coils of course oppose no direct resistance to the progress of a direct current, and even where alternating currents are used by employing a few turns of wire of a large diameter and depriving such coils of any iron which may be magnetized by them the opposition to alternating currents is reduced to inappreciable dimensions. The reason for this is that the alternating currents, even of the highest frequency, used in practice at present have a frequency vastly less than that of the static movement and will therefore find vastly less opposition from a given choke-coil. It is further true that where no iron core is supplied for a choking-coil the alternating currents generated in practice meet with little or no self-induction in such coil, while, on the other hand, a static discharge finds more opposition in a coil of thick wire having a long radius of curvature and without any iron than it would do in a thin wire wound closely on an iron core. I prefer to employ coreless coils wound in a single plane for this purpose, although any form of coil may be used in this connection, if desired.

Where the cause for static discharges on a given line is found in the induction effect of a lightning discharge, we may look upon the latter as a primary and the line of distribution as a secondary. In this case static discharges are prevented in the secondary or the electric line of distribution by the high-induction resistance therein due to the presence of the choking-coils 3.

It will be evident that my invention may be employed either with an all-metal circuit or with a return-ground; and I do not desire to be understood as limiting my invention either in this respect or with regard to the size, proportion, or nature of the choking-coils. It is also evident that my invention may be employed either with or without spark-arresters; but, as above indicated, I prefer to use these coils without such arresters where the line to be protected is carrying current of extremely large potential.

What I claim is—

1. In a system of electrical distribution, the combination with a source of current and translating devices, of a line-circuit provided at suitable intervals with ungrounded inductive resistances, said resistances serving to dissipate static charges by transforming their energy into heat.

2. In a system of electrical distribution, the combination with a suitable generator and translating devices, of a line-circuit having a series of ungrounded choke-coils arranged at intervals therein, said choke-coils serving to dissipate static charges by transforming their energy into heat, substantially as described.

In testimony whereof I have hereunto subscribed my name this 5th day of July, A. D. 1893.

ALEXANDER WURTS.

Witnesses:
JAMES L. STRANAHAN,
CHARLES W. BURK.